United States Patent
Ohsaki et al.

[11] Patent Number: 5,769,115
[45] Date of Patent: Jun. 23, 1998

[54] CONTROL VALVE

[75] Inventors: Hiroshi Ohsaki; Shinji Hojo, both of Sashima-gun, Japan

[73] Assignee: Kyosan Denki Co., Ltd., Tokyo, Japan

[21] Appl. No.: 576,857

[22] Filed: Dec. 22, 1995

Related U.S. Application Data

[63] Continuation of Ser. No. 281,239, Jul. 27, 1994, abandoned.

[30] Foreign Application Priority Data

Aug. 4, 1993 [JP] Japan ................................. 5-050232

[51] Int. Cl.$^6$ .................................................. F16K 17/08
[52] U.S. Cl. .......................................... 137/469; 137/540
[58] Field of Search ..................................... 137/469, 540

[56] References Cited

U.S. PATENT DOCUMENTS

| | | | |
|---|---|---|---|
| 2,431,769 | 12/1947 | Parker | 137/469 |
| 2,886,058 | 5/1959 | Horton | 137/540 X |
| 3,149,643 | 9/1964 | Breitsprecher | 137/469 |
| 3,393,702 | 7/1968 | Ferrill | 137/540 X |
| 3,430,646 | 3/1969 | Vick | 137/540 X |
| 3,446,238 | 5/1969 | Norstrud et al. | 137/469 |
| 3,702,141 | 11/1972 | Wetterhorn | 137/469 |

*Primary Examiner*—Stephen M. Hepperle
*Attorney, Agent, or Firm*—Flynn, Thiel, Boutell & Tanis, P.C.

[57] ABSTRACT

In a control valve for permitting a valve to open when pressure applied to the valve exceeds a given value so as to escape a given flow rate through a gap defined around the valve, it prevents the valve from floating between a valve seat and a stopper and prevent the valve from striking against the valve seat, the inner surface of a casing and a stopper, thereby preventing the production of noise. The gap defined between the periphery of the valve and a casing is set to be small while the velocity V of the fluid flowing through the gap is increased so as to increase resistance force operating on the valve, whereby the valve always contacts the stopper whenever the valve is opened. There is provided a fluid passage through which fluid passes inside and outside the valve for compensating the flow rate which corresponds to the reduced flow rate caused by the reduction of the gap.

9 Claims, 4 Drawing Sheets

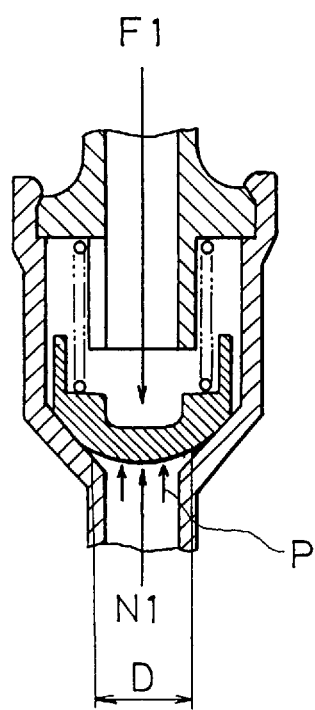
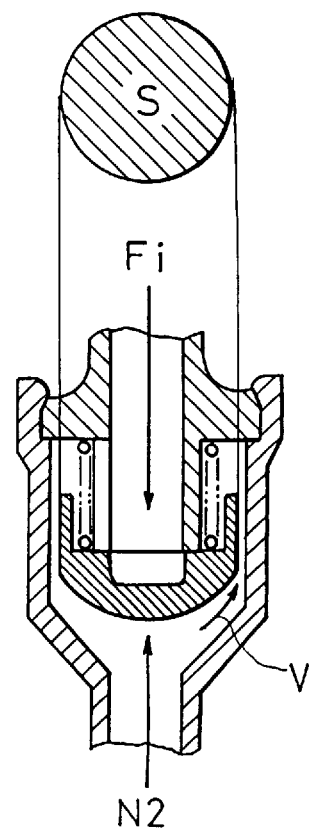
FIG. 4A
PRIOR ART
FIG. 4B
PRIOR ART

CONTROL VALVE

This application is a continuation of U.S. Ser. No. 08/281 239, filed Jul. 27, 1994 now abandoned.

BACKGROUND OF THE INVENTION

1. Field of the Invention:

The present invention relates to a control valve for controlling flow rate and fluid pressure of a fuel supply system or air supply system of an internal combustion engine.

2. Prior Art:

Exemplified in FIG. 2 is a prior art control valve which is used for controlling fluid pressure in a fuel tank of an internal combustion engine for automobiles.

A control valve 1 comprises a cylindrical casing 3 having a port 6 communicating with a fuel tank side (not shown) and a casing 2 retained by the casing 3 at the end thereof. The casing 2 has a port 4 communicating with a canister side and a stopper 11. The stopper 11 comprises a plurality of legs respectively protruding downward and fluid flows beside the stopper 11, namely, between the legs. The casing 3 has a valve seat 8 therein. A valve 9 is also provided inside the casing 3 and it contacts the valve seat 8. The valve 9 has a shape of shell having a dent 10 therein and it is set to be slidable inside the casing 3.

Since a gap 7 defined between the valve 9 and the casing 3 serves as a fluid passage, it has an area having at least a minimum area so as to assure a given set flow rate. The valve 9 is pressed against the valve seat 8 by resiliency of a spring 5. The stopper 11 restricts an operating scope of the valve 9 in the upward direction when the valve 9 slides vertically within the gap 7. A stage 10a is provided inside the dent 10. When the stopper 11 contacts the stage 10a, it stops the upward movement of the valve 9.

An operation of the prior art control valve 1 will be described hereinafter.

The prior art control valve permits fluid pressure at the fuel tank side to escape toward the canister side. When the fluid pressure at the fuel tanks side surpasses the resiliency of the spring 5, the valve 9 is lifted and opened. FIG. 4 shows the state where the valve 9 is closed (left side view) and the state where the valve 9 is opened (right side view) in which the following expressions are established.

Value is closed $$(D^2/4)\pi P = N1 < F1 \quad (1)$$

Valve is opened $$Cd(1/2)\rho V^2 S = N2 > Fi \quad (2)$$

where D is a diameter of the valve seat 8, S is a projected area of the valve 9, N1 is force applied to the valve 9 immediately before the valve 9 is opened (hereinafter referred to as valve opening force), N2 is resistance force applied to the valve 9 after the valve is opened (hereinafter referred to as resistance force), F1 is resiliency of the spring 5 when the valve 9 is closed, Fi is resiliency of the spring 5 when the valve 9 is opened, Cd is drag coefficient of fluid operating on the valve 9, V is velocity of fluid which flows beside the valve 9 when the valve 9 is opened, p is fluid density, P is fluid pressure applied to the valve 9.

The valve opening force N1 in the expression (1) varies less while the resistance force N2 in the expression (2) is resistance operating on the valve 9 which is placed in the flow of the fluid and it is proportional to the square of the velocity V, hence it varies greatly.

Whereupon, the resiliency Fi of the spring 5 when the valve 9 is opened is determined by the resiliency of F1 of the spring 5 when the valve 9 is closed and a spring constant. However, if the following expression is established, namely, N2=Fi is established, the valve 9 floats between the stopper 11 and the valve seat 8 so that the motion of the valve 9 is not stable. As a result, the valve 9 strikes against the inner surface of the casing 3, which leads to production of noise. Generally speaking, the valve 9 is preferable to contacts either of the valve seat 8 or the stopper 11 but not preferable to float between the stopper 11 and the valve seat 8.

SUMMARY OF THE INVENTION

In view of the above, it is an object of the present invention to prevent the valve 9 from floating at the state immediately after the valve 9 is opened, that is, the relation of N2>Fi in the expression (2) is maintained but the relation of N2=Fi is not established during the opening of the valve 9. This is achieved by fulfilling the following condition. That is, if either of the projected area A of the valve 9 or the velocity V of fluid which flows the gap 7 of the valve 9 or both of them are increased immediately after the valve is opened, the relation of N2=Fi is not established, thereby preventing the valve 9 from floating between the stopper 11 and the valve seat 8.

However, if the condition that either of the projected area A of the valve 9 or the velocity V of fluid which flows the gap 7 of the valve 9 or both of them are increased immediately after the valve is opened is fulfilled, the gap 7 is narrowed provided that the radius of the valve 9 is the same as that of the casing 3. However, if the gap 7 is narrowed, flow rate is reduced. An inherent function of the control valve 1 of this type is to escape the fluid when the fluid pressure increases (for example, evaporative emission produced in the fuel tank is fed to the canister), hence the reduction of the flow rate is not preferable.

It is a feature of the present invention to eliminate the state where the expression Fi=N2 is established without reduction of the flow rate. To meet this requirement, a control valve of the present invention is provided with a fluid passage 12f through which fluid passes inside a valve 12 and outside the valve 12.

That is, if the gap 6 in FIG. 1 is reduced, the projected area S2 is enlarged and the fluid velocity V is also increased so that resistance force N2 is sufficiently increased. On the contrary, if the gap σ is reduced, it is considered that a sufficient flow rate can not be obtained even if the fluid velocity V is increased. Accordingly, the present invention is provided with the fluid passage 12f through which fluid passes inside and outside the valve 12 for compensating the flow rate which corresponds to the reduced flow rate caused by the reduction of the gap σ.

According to the control valve of the present invention, since the fluid velocity V of the fluid flowing through the gap σ is high, the resistance force N2 in the expression (2) is increased so that the relation of N2>Fi is maintained with assurance and the state where the relation of N2=Fi is established is prevented. Furthermore, since the fluid flows through the fluid passage 12f, the flow rate is not reduced as a whole.

BRIEF DESCRIPTION OF THE DRAWINGS

FIGS. 4A a closed cross-sectional views showing an operation of the control valve in FIG. 2; and FIG. 4B is a cross-sectional view showing an open operation of the control valve in FIG. 2.

DESCRIPTION OF PREFERRED EMBODIMENT

Figure 1:
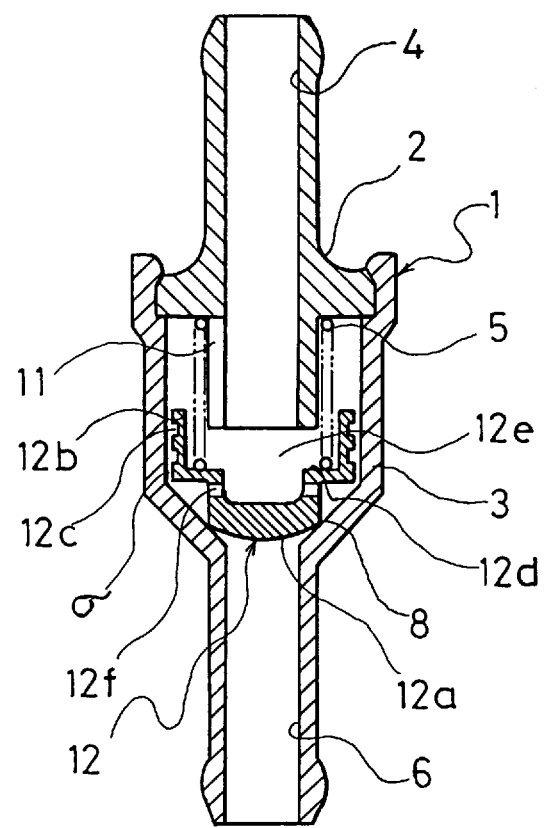
FIG. 1 is a cross-sectional view of a control valve according to a preferred embodiment of the invention.

A control valve 1 of the present invention will be described hereinafter with reference to FIGS. 1 and 3.

Figure 2:
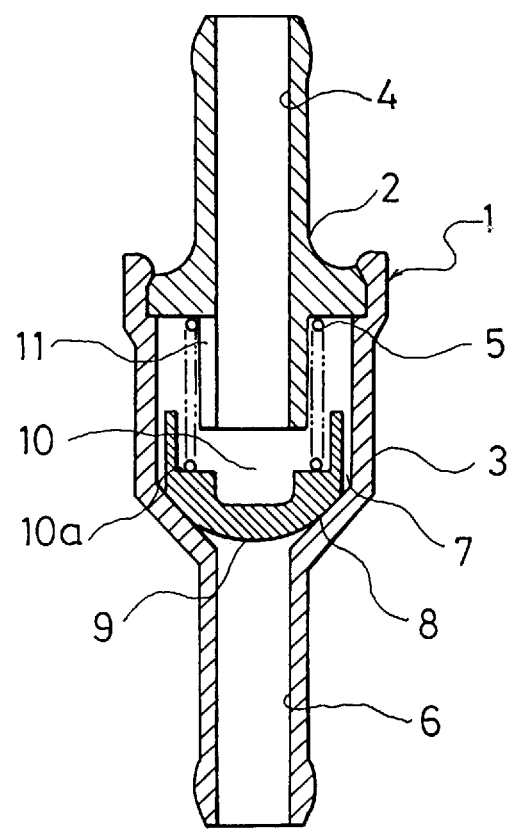
FIG. 2 is a cross-sectional view of a prior art control valve.

Configurations of casings 2 and 3 are the same as those of the prior art control valve as shown in FIGS. 2 and 4 and hence the explanations thereof are omitted. Denoted at 12 is a valve which comprises a spherical valve portion 12a at the lower end thereof and a cylindrical sleeve part or sliding portion 12b at the upper portion thereof. There is defined a minute gap σ between the sliding portion 12b and the inner surface of the casing 3 wherein the sliding portion 12 can slide in the gap a σ. At least one circumferential groove 12c is provided on the sliding portion 12b at the portion confronting the gap σ. The groove 12c increases the resistance of fluid which flows the gap σ, thereby permitting the resistance operating on the valve 12, i.e. Cd in the expression (2) to be large. The groove 12c is not always necessary and can be omitted. A shoulder part 12d is provided between the valve portion 12a and the sliding portion 12b. A dent or fore 12e is provided inside the valve 12. A spring 5 is accommodated in the dent 12e and the lower end of the spring 5 is brought into contact with an inner horizontal surface defined by the shoulder part 12d. The valve 12 is provided with the fluid passage 12f through which fluid passes inside and outside the valve 12 for compensating the flow rate which corresponds to the reduced flow rate caused by the reduction of the gap σ, thereby assuring the flow rate. The fluid passage 12f is positioned downstream relative to the position where the valve 12 contacts the valve seat 8.

An operation of the control valve 1 of the present invention will be described hereinafter.

Figure 3A:
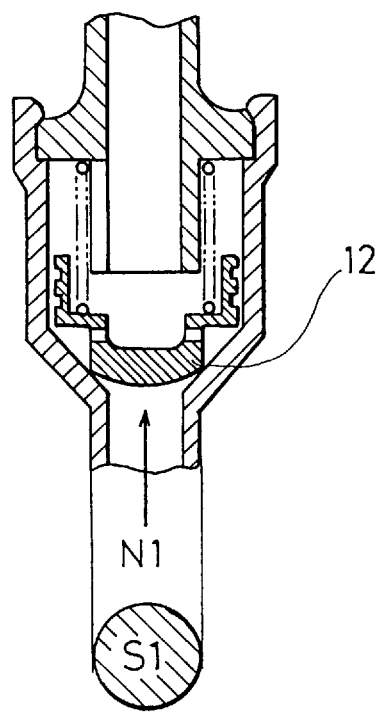
FIGS. 3A cross-sectional views showing FIG. 3A a closed operation of the control valve in FIG. 1.
Figure 3B:
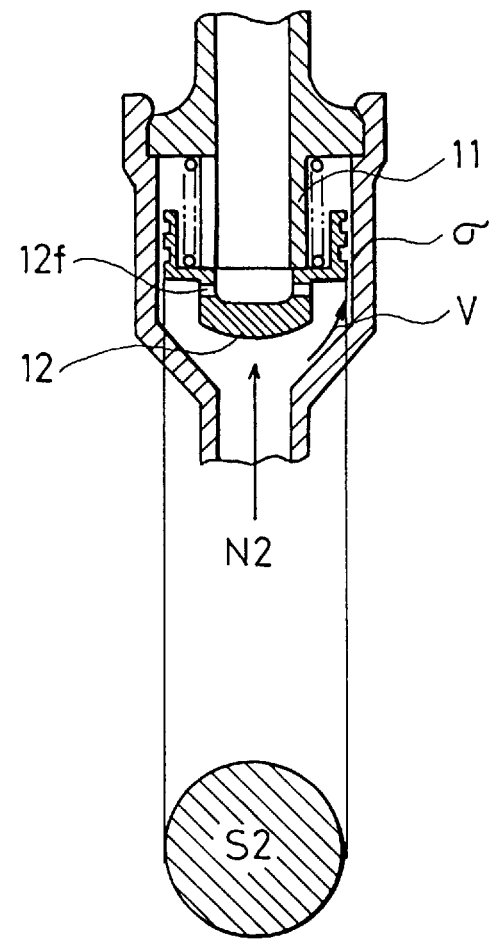
FIG. 3B is a cross-sectional view showing an operation of the control valve in FIG. 1 with the valve open.

A state immediately before the valve 9 is opened is illustrated in the FIG. 3A. The valve opening force N1 operating on the valve 12 is expressed as P.S1 supposing that P is fluid pressure and S1 is an area to which pressure is applied as shown in the expression (1). S1 equals to $(D^2/4)\pi$.

When the valve opening force N1 applied to the valve 12 to thereby open the valve 12, the resistance force N2 operating on the valve 12 is expressed by $Cd(\frac{1}{2})\rho V^2 S2$. Since the gap ρ is sufficiently small, the fluid velocity V is increased, whereby the value of $Cd(\frac{1}{2})\rho V^2 S2$ is increased.

As a result, the valve 12 rises rapidly until it contacts the stopper 11 so that it does not float in a midway portion. Furthermore, the fluid flows through the fluid passage 12f, the flow rate can be assured.

With the arrangement of the control valve of the present invention, there are following advantages. Firstly, the valve is prevented from floating between the valve seat and the stopper so that noise is not produced at all. Secondly, since the value is provided with the fluid passage through which the fluid flows inside and outside the valve, the minimum flow rate can be sufficiently assured.

What is claimed is:

1. A pressure-responsive control valve assembly, comprising:

a casing defining therein an internal valve chamber defined by a surrounding inner wall, said casing having inlet and outlet ports formed adjacent opposite ends thereof and communicating with said valve chamber, said casing also defining thereon an annular valve seat at an end of said chamber at said inlet port;

a valve unit movably disposed within said valve chamber and including a valve head adapted for sealing engagement with said valve seat when said valve unit is in a closed state;

a spring acting against said valve unit for normally maintaining the valve head in sealing engagement with the valve seat to prevent flow of fluid from said inlet port to said outlet port;

said valve unit including a valve part which is fixed to and projects downstream of said valve head and is movably disposed within said valve chamber, said valve part having an outer peripheral wall which is disposed adjacent but at least slightly spaced from the inner wall of the casing to define a small annular gap therebetween which is disposed downstream of said valve seat, said annular gap having a downstream end thereof disposed in communication with said outlet port, said annular gap having an upstream end thereof disposed in communication with said inlet port downstream of said valve seat so as to be in open communication with the inlet port only when the valve unit is in an open state, said annular gap defining a first flow path for permitting fluid flow from said inlet port to said outlet port in the open state of said valve unit;

a stopper stationarily mounted on said casing for abutment with the valve unit when the latter is moved away from the valve seat into an open state; and said valve unit having a fluid passageway formed therein and extending therethrough, said fluid passage having an inlet end which communicates with said valve chamber downstream of said valve seat but generally upstream of said small annular gap, said fluid passage having a downstream end which opens through said valve unit at a location generally downstream of said small annular gap for providing communication with said outlet port, said passageway defining a second flow path which extends generally in parallel relationship to said first flow path for permitting fluid flow therethrough from said inlet port to said outlet sort only when said valve unit is in said open state;

whereby the valve unit is stably maintained in engagement with the stopper when the valve unit is in the open state.

2. A fluid control valve assembly comprising:

a casing with an internal valve chamber defined by a casing inner wall, said casing formed to define an inlet port at one end of said valve chamber, an outlet port at a second end of said valve chamber and a valve seat adjacent said inlet port;

a valve unit disposed in said valve chamber, said valve unit including a valve head positioned to abut said valve seat when said valve assembly is in a closed state;

a spring disposed in said valve chamber against said valve unit to urge said valve unit into the closed state against said valve seat;

said valve unit including a shoulder part extending circumferentially around said valve head and a sleeve part connected to the periphery of said shoulder part and having an elongated outer surface, said shoulder and sleeve parts being dimensioned to define a small flow gap between said casing inner wall and an outer surface of said sleeve part so that, when said valve unit is in an open state, fluid flows from said inlet port through said gap to said outlet port, and said outer surface of said sleeve part being formed with at least one groove in the outer surface thereof to increase fluid flow resistance through the gap;

said valve unit being formed with a fluid passageway therein extending between a location where said valve head abuts said valve seat and the interior of said sleeve part, said fluid passageway allowing fluid flow therethrough from said inlet port to said outlet port only when said valve unit is in its said open state; and a stopper disposed in said valve chamber adjacent said outlet port, said valve unit being disposed around said stopper and said stopper having at least one passageway for allowing fluid flow therethrough.

3. The fluid control valve assembly of claim 2, wherein said sleeve part of said valve unit is disposed around said stopper, and said valve unit abutting said stopper when in said open state.

4. A valve assembly according to claim 1, wherein the valve part has a bore which opens inwardly thereof from a downstream end thereof so that said bore is open and generally in continuous communication with said outlet port, said bore terminating in a closed end, and said passageway at its downstream end opening directly into said bore.

5. A valve assembly according to claim 4, wherein said inlet and outlet ports are generally coaxially aligned at opposite ends of the valve chamber, and said stopper is fixed to said casing and projects inwardly therefrom into said valve chamber so as to project into said bore.

6. A valve assembly according to claim 1, wherein said valve part is of a generally cylindrical configuration having an outer peripheral surface which is generally cylindrical and defines one boundary of said gap, and said cylindrical part having a plurality of surrounding grooves formed in and opening inwardly of said peripheral surface to increase the resistance of the fluid flowing through said gap.

7. A valve assembly according to claim 1, wherein said value head has an outwardly curved surface positioned to abut said valve seat, and said valve part including a shoulder which is disposed circumferentially around said valve head and projects radially outwardly therefrom, said valve part also including a sleeve part which is fixed to and projects in a downstream direction away from said shoulder with said sleeve part defining thereon an outer peripheral wall which is disposed opposite the inner wall of the chamber so as to define said annular gap therebetween.

8. A valve assembly according to claim 7, wherein said valve unit includes a bore which opens inwardly from a downstream end thereof, said bore extending through said sleeve part and opening inwardly a limited extent into said valve head so as to terminate in a closed end, and said fluid passageway being defined by at least one small port which is formed directly in said valve unit and has an upstream end formed in said valve head and a downstream end which opens directly into said bore.

9. A valve assembly according to claim 8, wherein said valve unit has at least two said small ports formed therein for defining said passageway, each said small port projecting generally radially through said valve head so that a downstream end of each said small port communicates directly with an inner end of the bore, and an upstream end of each said small port opens adjacent but upstream of the shoulder for communication with the valve chamber at a location disposed between said valve seat and said annular gap.

* * * * *